US010951690B2

(12) United States Patent
Rutkowski et al.

(10) Patent No.: US 10,951,690 B2
(45) Date of Patent: Mar. 16, 2021

(54) NEAR REAL-TIME COMPUTATION OF SCALING UNIT'S LOAD AND AVAILABILITY STATE

(71) Applicant: Microsoft Technology Licensing, LLC, Redmond, WA (US)

(72) Inventors: Bradley Rutkowski, Woodinville, WA (US); Saraswathy Srinivasan, Sammamish, WA (US); Gregory Thiel, Black Diamond, WA (US); Rajesh Maskara, Redmond, WA (US); Todd Luttinen, Redmond, WA (US); Kushal Suresh Narkhede, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/871,839

(22) Filed: Jan. 15, 2018

(65) Prior Publication Data

US 2019/0098081 A1 Mar. 28, 2019

Related U.S. Application Data

(60) Provisional application No. 62/562,135, filed on Sep. 22, 2017.

(51) Int. Cl.
*H04L 29/08* (2006.01)
*H04L 29/12* (2006.01)
(Continued)

(52) U.S. Cl.
CPC ...... *H04L 67/1008* (2013.01); *H04L 61/1511* (2013.01); *H04L 41/12* (2013.01); *H04L 43/0817* (2013.01)

(58) Field of Classification Search
CPC ............... H04L 29/12066; H04L 41/12; H04L 41/0896; H04L 43/0817; H04L 61/1511;
(Continued)

(56) References Cited

U.S. PATENT DOCUMENTS

| 9,215,275 B2 | 12/2015 | Kannan et al. |
| 2002/0032777 A1 | 3/2002 | Kawata et al. |

(Continued)

FOREIGN PATENT DOCUMENTS

| WO | 2015149830 A1 | 10/2015 |
| WO | 2016066218 A1 | 5/2016 |

*Primary Examiner* — Clayton R Williams
*Assistant Examiner* — Michael Li

(57) ABSTRACT

Various embodiments of the present technology generally relate to systems and methods for intelligent load shedding. More specifically, various embodiments of the present technology generally relate to intelligent load shedding of traffic based on current load state of target capacity. In some embodiments, a first server can send a capacity request indicating that the first server is nearing capacity and needs assistance with load. In response to the capacity request, an assistance request can be published to additional nearby servers. The servers can respond with a status update providing load and availability information. Based on the load and availability information (or other information such as latency), a second server from the additional servers can be selected and traffic can be routed away from the first server to the second server.

20 Claims, 7 Drawing Sheets

(51) Int. Cl.
*H04L 12/24* (2006.01)
*H04L 12/26* (2006.01)

(58) Field of Classification Search
CPC .. H04L 63/00; H04L 67/1008; G06F 11/3419; G06F 11/3612
USPC ........................................................ 709/226
See application file for complete search history.

(56) References Cited

U.S. PATENT DOCUMENTS

| | | |
|---|---|---|
| 2005/0027862 A1 | 2/2005 | Nguyen et al. |
| 2006/0069780 A1 | 3/2006 | Batni et al. |
| 2008/0307036 A1 | 12/2008 | Mishra et al. |
| 2009/0138586 A1 | 5/2009 | Maschio-esposito et al. |
| 2009/0327489 A1* | 12/2009 | Swildens ................ G06F 9/505 709/224 |
| 2010/0220622 A1 | 9/2010 | Wei |
| 2010/0223378 A1* | 9/2010 | Wei .................... H04L 41/0896 709/224 |
| 2012/0179814 A1* | 7/2012 | Swildens ................ H04L 12/14 709/224 |
| 2015/0095892 A1* | 4/2015 | Baggott .............. G06F 11/3419 717/127 |
| 2016/0044096 A1 | 2/2016 | Narayanan et al. |

\* cited by examiner

NEAR REAL-TIME COMPUTATION OF SCALING UNIT'S LOAD AND AVAILABILITY STATE

CROSS-REFERENCE TO RELATED APPLICATIONS

This application claims priority to U.S. Provisional Application Ser. No. 62/562,135 filed Sep. 22, 2017, which is incorporated herein by reference in its entirety for all purposes.

BACKGROUND

Modern electronic devices such as computers, tablets, mobile phones, wearable devices and the like have become a common part of modern life. Many users of electronic devices routinely utilize various types of software applications for business and personal activities. Examples of software applications can include word processors, spreadsheet applications, e-mail clients, notetaking software, presentation applications, games, computational software, and others. These software applications can also be used to perform calculations, produce charts, organize data, receive and send e-mails, communicate in real-time with others, and the like. The software applications can range from simple software to very complex software. Moreover, there are a variety of channels for delivering software and services to end-users such as cloud computing services.

Examples of popular cloud computing services include, but not limited to, software as a service (SaaS), platform as a service (PaaS), and the like. For example, SaaS is becoming a popular delivery mechanism where software applications are consumed by end-users over the internet. As a result, end-users do not have to install and run the applications locally as the applications are maintained in the cloud by the service provider. With these types of cloud computing services, the provider hosts the hardware and/or software resources that end-users can access over a network connection. Moreover, these distributed large-scale cloud services often have hundreds of thousands of front-end servers. These servers are bucketized into scaling units by physical or logical attributes (e.g., dimension, forest, ring etc.). Appropriately routing traffic to the servers is a challenging problem.

Overall, the examples herein of some prior or related systems and their associated limitations are intended to be illustrative and not exclusive. Upon reading the following, other limitations of existing or prior systems will become apparent to those of skill in the art.

SUMMARY

Various embodiments of the present technology generally relate to systems and methods for intelligent load shedding. More specifically, various embodiments of the present technology generally relate to intelligent load shedding of traffic based on current load state of target capacity. In some embodiments, a first server can send a capacity request indicating that the first server is nearing capacity and needs assistance with load. This capacity request may be generated based on actual load or predicted load (e.g., DNS responses that identify the IP address of the first server, etc.). In response to the capacity request, an assistance request can be published to additional nearby servers.

The servers can respond with a status update providing load and availability information. Based on the load and availability information (or other information such as latency), a second server from the additional servers can be selected and traffic can be routed away from the first server to the second server (e.g., by returning an IP address of the second server in response to future DNS resolution queries). In some embodiments, the status update includes an indication one or more of server health, server capacity, server resource utilization, predicted server resource utilization, server processor utilization rates, server wait times, server response times, and/or server queue lengths.

Some embodiments provide for a system for managing server traffic, the system comprising a memory, a process, a central controller, a central store, a DNS service, a topology service, and/or other components. The central controller can be configured to determine a status of each server in a set of servers. The central store can be configured to store the status of each server determined by the central controller. The DNS service can be configured to receive a DNS query from a device, identify a first server from the set of servers that has a status indicating the first server is not critically loaded based on the entries in the central store, and return an IP address of the first server in response to the DNS query. In some embodiments, the central controller can receive the status from each of the server on a periodic schedule and generates a scaling unit status by aggregating status updates from servers within the scaling unit. Upon receiving a request for assistance, the system can gradually transfer the load from the second server to the one or more servers until the status from the second server changes to indicate that the second server is available to accept new traffic. The topology service can be configured to collect topology information of a data center and communicate the topology information to the central controller. In some embodiments, the set of servers are organized into scaling units based on physical or logical attributes.

Embodiments of the present invention also include computer-readable storage media containing sets of instructions to cause one or more processors to perform the methods, variations of the methods, and other operations described herein.

In some embodiments, each server can publish (e.g., every second) current load state. A service running on the server checks the load state of the server every thirty seconds and publishes it to a central store (e.g., an ObjectStore or brain). Each time the service publishes the information, the central store can aggregate and re-compute the load state of a scaling unit that the server belongs to. In some embodiments, all servers in a given rack belong may one scaling unit (e.g., each set of twenty to forty-five servers can grouped together into scaling units). Some embodiments provide for a separate service running on each server that makes a call to the central store periodically (e.g., every 30 seconds) to identify which scaling units the incoming traffic should be routed to. The central store can only return scaling units that are nearest to the calling server and does not have a computed state of "overloaded". This ensures that as soon as a scaling unit is computed as "overloaded" by the central store, within seconds the incoming traffic to the scaling unit starts decreasing.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings in which.

Figure 1:
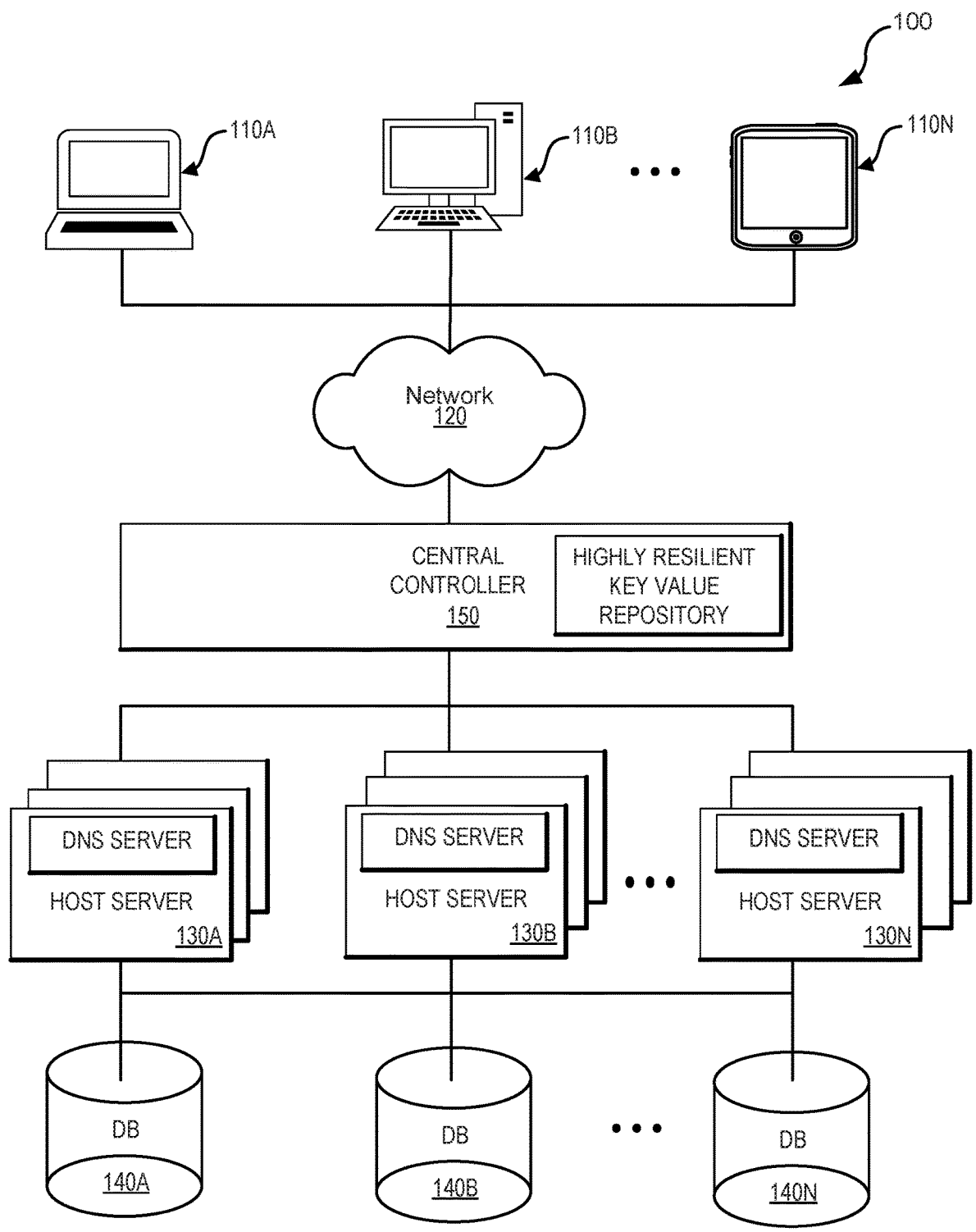
FIG. 1 illustrates an example of an environment capable of implementing an intelligent load shedding system in accordance with some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems and methods for computation of scaling unit load and availability state. Distributed large-scale cloud services have hundreds of thousands of front-end servers. These servers are often bucketized into scaling units by physical or logical attributes (e.g., dimension, forest, ring, etc.). Each scaling unit has finite number of resources (e.g., compute, storage, disk etc.). When a scaling unit becomes overutilized, identifying the overload condition quickly and routing incoming traffic away from the overutilized scaling unit as quickly as possible is important. Traditional solutions depend on a software load balancer that manages load over a large scaling unit (e.g., a fault domain). If the loadbalancer identifies that no nodes are available to route the incoming traffic, a load-shedding algorithm kicks in to redirect the incoming requests to a separate super-ring.

Irrespective of the bucketization method, various embodiments of the present technology compute load and availability of the scaling unit to ensure that incoming traffic can be effectively routed to only the front-end servers that are available and not overloaded. Some embodiments use an anycast DNS endpoint to route DNS requests and central store to compute load and availability state for each scaling unit. For example, some embodiments, identify and manage one datacenter rack as an individual scaling unit and route to the individual scaling unit using anycast DNS. By keeping these scaling units small, some embodiments allow for quick computation and small fault domains. In addition, this more granular analysis allows some embodiments to manage traffic at a granular scale.

Some embodiments use a central store (e.g., an ObjectStore) where all the front-end servers can publish their respective load and availability information. This allows for near real-time computation of load and availability state of each scaling unit (e.g., thirty seconds). Some embodiments allow each server to upload its load and availability state to a central brain. Once enough servers in a scaling unit (e.g., a datacenter rack) publish that they are overloaded, the central store (e.g., brain) stops returning that scaling unit as an available endpoint to all other servers in the region. This effectively halts net new traffic being routed to the rack that has been identified as overloaded.

Various embodiments of the present technology provide for a wide range of technical effects, advantages, and/or improvements to computing systems and components. For example, various embodiments include one or more of the following technical effects, advantages, and/or improvements: 1) intelligent load shedding that sheds incoming traffic requests to scaling units based on the current resource utilization on the scaling units; 2) elastic assistance (e.g., seek load N levels deep only when required); 3) proactive and gradual load shedding (e.g., anticipate and proactively shed load making the load shedding gradual); 4) distributed denial of service (DDoS) protection via near real-time computation of load in a central store; 5) protocol agnostic load-shedding design (e.g., coordinated and proportional load-shedding across protocols); 6) DNS reservations; 7) new techniques for traffic routing implementations that route traffic based on real-time prediction of anticipated load on scaling units based on actual historical DNS responses; 8) scaling units with small fault domains directing traffic to self-based on anycast DNS; 9) use of unconventional and non-routine operations to automatically route traffic; and/or 10) changing the manner in which a computing system reacts to the DNS requests.

Some embodiments include additional technical effects, advantages, and/or improvements to computing systems and components. In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a large data centers and cloud computing systems with dynamic topologies, embodiments of the present technology are equally applicable to various other instantiations where system monitoring and traffic management services are needed (e.g., network configuration).

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 7:
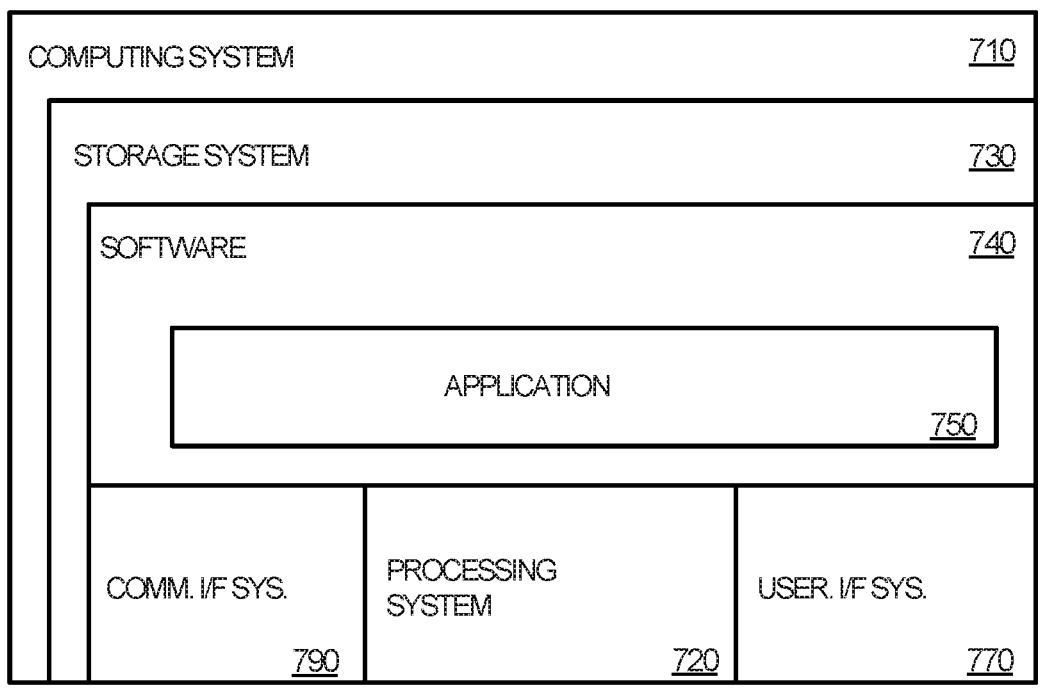
FIG. 7 illustrates an example of a computing system, which is representative of any system or collection of systems in which the various applications, services, scenarios, and processes disclosed herein may be implemented.

FIG. 1 illustrates an example of an environment 100 capable of implementing an intelligent load shedding system in accordance with some embodiments of the present technology. As illustrated in FIG. 1, environment 100 may include one or more computing devices 110A-110N, communications network 120, host servers 130A-130N, database 140A-140N, and central controller 150. Computing devices 110A-110N can be any computing system capable of running an application natively or in the context of a web browser, streaming an application, or executing an application in any other manner. Examples of computing system 110 include, but are not limited to, personal computers, mobile phones, tablet computers, desktop computers, laptop computers, wearable computing devices, thin client computing devices, virtual and/or augmented reality computing devices, virtual machine hosting a computing environment, distributed application, server computer, computing cluster, application hosted as software as a service (SaaS), application running on a platform as a service (PaaS), application running on an infrastructure as a service (IaaS) or any other form factor, including any combination of computers or variations thereof. One such representative architecture is illustrated in FIG. 7 with respect to computing system 710.

Those skilled in the art will appreciate that various components (not shown) may be included in computing devices 110A-110N to enable network communication with communications network 120. In some cases, communications network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

As illustrated in FIG. 1, in some embodiments, a DNS server can be co-hosted with each of the host servers 130A-130N. In other embodiments, DNS server can live separately, but then will have an intelligent lookup to identify which is the preferred host server 130A-130N based on the information like LDNS IP extracted out of the DNS packet. In accordance with some embodiments, there may be one instance of Object Store/Central Controller per ring. For example, in some embodiments, a certain number of rings (e.g., three rings) may be deployed for world-wide capacity to maintain fault domains (e.g., to limit the blast radius).

Central controller 150 can receive, pull, and process status information about from various system components such as host servers 130A-130N, databases 140A-140N, utility grids, automatic transfer switches, uninterrupted power supplies, power distribution units, cooling equipment, backup generators, and other components. For example, central controller 150 may receive various signals such as processor utilization rates, wait times, response times, queue lengths, and the like. These signals can be used to create synthetic conditions that are based on a combination of two or more raw signals. Central controller 150 can use these signals and conditions to make load-shedding and routing decisions based on knowledge of load of the destination device. As such, instead of blindly throwing a portion of incoming traffic to nearby locations, traffic can be routed from a location that needs assistance using intelligent routing based current load, resources, location, and/or other factors.

In accordance with various embodiments, location A (e.g., server, scaling unit, data center, etc.) can stretch and contract how many levels of locations it seeks assistance from based on the current traffic computation. In some embodiments, a location can go N levels deep when searching for target locations to shed traffic to. As current load and assistance requirement is computed every few seconds across entire capacity boundary, this enables elastic load-shedding. A wave of incoming requests can be served by seeking assistance multiple levels deep but requests after the wave has subsided can be served from Location A itself.

In some embodiments, a location can seek assistance from other nearby locations (e.g., chosen based on proximity defined by latency) proactively before the location enters a capacity crunch mode. If a location needs X underutilized scaling units to serve the current rate of incoming traffic, the location does not wait till there are less than X underutilized scaling units available before seeking assistance. Rather, the location can avoid entering crunch mode by seek assistance when less than (X+Y) underutilized scaling units are available. This behavior enforces slow gradual transition of net-new incoming traffic from being served exclusively from Location A to being served exclusively from Location B. Such techniques can also protect Location A from getting into a scenario wherein the location loses the functionality to serve traffic because of being overloaded.

Load-shedding features of various embodiments can be designed to be protocol agnostic. For example, in some embodiments, load-shedding can be conducted at the DNS layer which is agnostic to protocols consuming load state information like CPU, Disk, and Memory which are also agnostic to protocols stored on a central store which is also not protocol-specific. This ensures that shedding of HTTP/HTTPS and non-HTTP requests (e.g., TCP, FTP etc.) is coordinated and proportional.

In some embodiments, the DNS response of scaling unit X's IP address can be treated as a future reservation of its capacity. As such, rather than reacting to the current load characteristics of the system, some embodiments can react to the anticipated future load characteristics of the system. A scaling unit would mark itself as overutilized not because it is currently under stress but because it is expecting to be under stress based on the DNS responses that have been handed out.

In some embodiments, the central controller can utilize an ObjectStore table schema design. Some embodiments can model the capacity and load signal into ObjectStore using various combinations of tables. For example, some embodiments can use a DNS Partition Mapping table that can map a DNS server to its partition. The key can include the DNS server name having partition keys as the value. Some embodiments may use a Capacity Unit Info table that can aggregate signals from load, maintenance activity, and the like at a capacity unit level. The key for this table can include the partition key plus the capacity unit name to create a composite key. The values can include a list of constituent machine names, an activity state, a switch state, a load state, and/or a unicast external IP address (e.g. IPv4 address or IPv6 address). A Frontdoor Partition Ping Matrix can be used in some embodiments. This table can capture the cost between two frontdoor partition units. The key can include source partition plus the destination partition to create a composite key. Look ups in the Frontdoor Partition Ping Matrix can be made based on just source partition using range query and return a value corresponding to the cost.

Some embodiments may use a MachineLoad Info table that can save the load information at the scope of a machine. The key can be the machine name and the value can include server load and/or server load state. Various last update time stamp and various metrics may also available. Examples of the metrics include processor utilization, available memory, http requests per second, and/or DNS requests per second. A FrontdoorMapping table can cache the result of frontdoor mapping compute in some embodiments. The key can be the DNS server name and the values can include a list of frontdoor addresses, IPv4 addresses, and/or IpV6 addresses.

Figure 2:
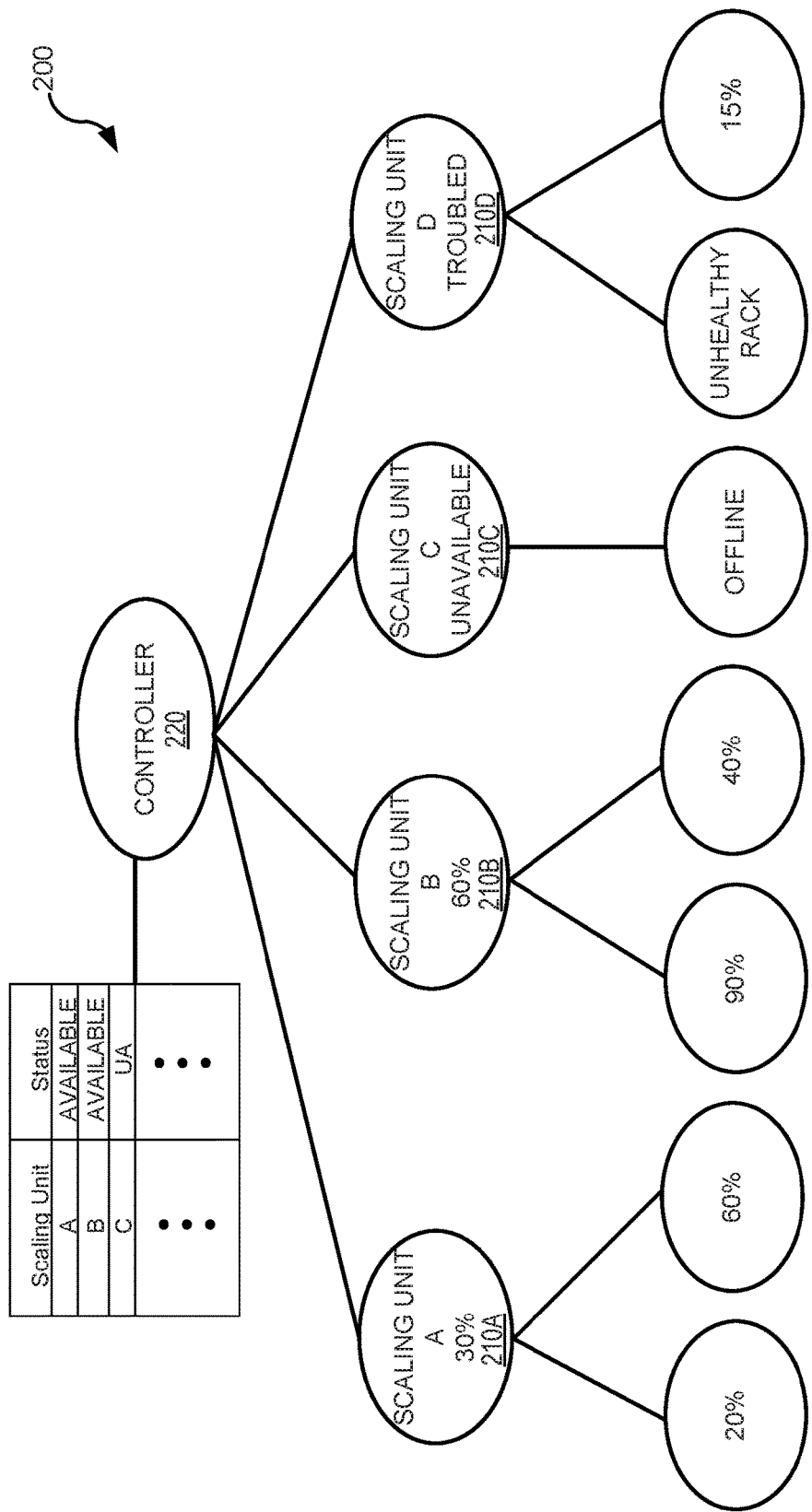
FIG. 2 illustrates an example of multiple scaling units reporting to a central controller according to one or more embodiments of the present technology.

FIG. 2 illustrates an example 200 of multiple scaling units 210A-210D reporting to a central controller 220 according to one or more embodiments of the present technology. Each scaling unit 210A-210D can identify the current status (e.g., health, utilization, capacity, etc.) of each rack. For example, as illustrated in FIG. 2, scaling unit A gets a report of 20% and 60% capacity, scaling unit B receives a report of 90% and 20% capacity, scaling unit C receives reports of the racks being offline, and scaling unit D receives a report of an unhealthy rack and a utilization of 15%. Each scaling unit can use this information to generate a current status (e.g., percent utilization, available capacity, tiered capacity levels, etc.) of the scaling unit's availability which is reported to the controller and published to the DNS server and other system components.

Based on the current resource utilization being reported to the controller, intelligent load shedding can be performed. As such, incoming traffic requests can be shed to scaling units based on the current resource utilization on the scaling units. Traditional proxies shed load when under pressure. However, majority of these implementations shed load from one big ring to another bigger ring with the assumption that the bigger ring has infinite capacity (i.e., more capacity than can be thrown at it). These traditional load-shedding techniques are blind and without knowledge of the current load characteristics of shedding target. In contrast, various embodiments of the present technology do not blindly throw portions of incoming traffic to nearby locations if a location needs assistance. Instead, various embodiments take into account current load and target location's current load. This can be done for every target location that a location needs assistance from and only the amount of traffic that the target locations can serve will be shed. This ensures that locations do not get blind-sided by unexpected load shed from some other location.

Some embodiments provide elastic assistance by seeking load N levels deep only when required. For example, location A can stretch and contract how many levels of locations to seek assistance from based on the current traffic computation. In some embodiments, a location can go N level deep when searching for target locations to shed traffic to. As current load and assistance requirement is computed (e.g., every few seconds) across entire capacity boundary, this enables elastic load-shedding. A wave of incoming requests can be served by seeking assistance multiple levels deep, but requests after the wave has subsided can be served from Location A itself.

Some embodiments provide for proactive and gradual load shedding (e.g., to anticipate and proactively shed load making the load shedding gradual). In some embodiments, a location can seek assistance from other nearby locations (e.g., chosen based on proximity defined by latency) proactively before the location enters capacity crunch mode. If a location needs X underutilized scaling units to serve the current rate of incoming traffic, the location does not wait till there are less than X underutilized scaling units available before seeking assistance. Rather, the location can avoid entering crunch mode by seek assistance when less than (X+Y) underutilized scaling units are available. This behavior enforces slow gradual transition of net-new incoming traffic from being served exclusively from Location A to being served exclusively from Location B. This behavior can also protect Location A from getting into a scenario where the functionality to serve traffic is lost because of being overloaded.

Distributed denial of service (DDoS) protection via near real-time computation of load in a central store can be present in some embodiments. Some embodiments provide for near real-time computation (e.g., every few seconds with max staleness of thirty seconds) of current availability and load for each scaling unit across the entire capacity boundary ensures that traffic is routed based on accurate and current load data. With a short time duration between incoming requests impacting load and subsequent requests being shed to other locations, some embodiments provide effective DDoS protection to each location (and even the ones that do not have minimum required capacity).

Some embodiments provide for a protocol agnostic load-shedding design (e.g., coordinated and proportional load-shedding across protocols). Load-shedding features of various embodiments can be designed to be protocol agnostic. For example, in some embodiments, load-shedding can be conducted at the DNS layer which is agnostic to protocols consuming load state information like CPU, Disk, and Memory which are also agnostic to protocols stored on a central store which is also not protocol-specific. This ensures that shedding of HTTP and non-HTTP requests can be coordinated and proportional.

In some embodiments, the DNS response of scaling unit X's IP address can be treated as a future reservation of its capacity. As such, rather than reacting to the current load characteristics of the system, various embodiments can react to the anticipated future load characteristics of the system. A scaling unit could mark itself as overutilized not because the scaling unit 210A-210D is currently under stress but because the scaling unit 210A-210D is expecting to be under stress based on the DNS responses that have been handed out. In some embodiments, traffic can drive load and load can drive future traffic to be shed/not shed. Some embodiments can use a DNS reservation design. As such, in some embodiments DNS requests can drive reservation of capacity which can drive traffic to be shed/not shed.

Some embodiments provide for traffic routing implementations that route traffic based on real-time prediction of anticipated load on scaling units based on actual historical DNS responses. Scaling units 210A-210D with small fault domains can direct traffic to itself based on an anycast DNS in some embodiments. Various embodiments can leverage anycast TCP or central store/brain. As a result, a small set of resources can identify if additional traffic should be routed to a scaling unit by simply withdrawing/publishing its IP address on an anycast DNS ring.

Figure 3:
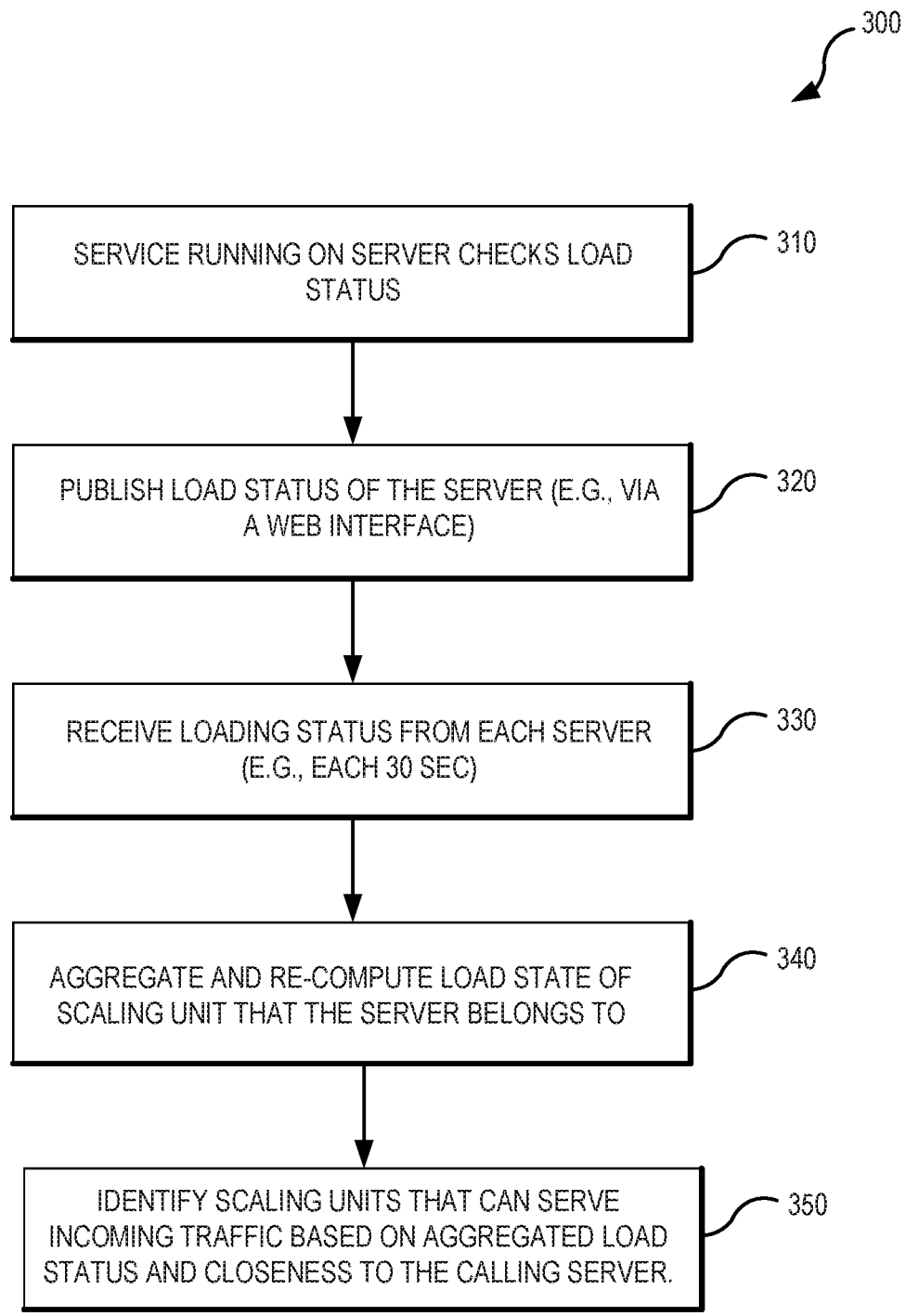
FIG. 3 illustrates an example of a set of operations for identifying scaling units for routing incoming traffic that may be used in one or more embodiments of the present technology.

FIG. 3 illustrates an example of a set of operations 300 for identifying scaling units for routing incoming traffic that may be used in one or more embodiments of the present technology. As illustrated in FIG. 3, each server can publish (e.g., every second) a current load state (e.g., via a web interface). Checking operation 310 can use a service running on the server to check the load state of the server (e.g., every thirty seconds, sixty seconds, etc.). The service can check the load and availability state at a higher frequency (for e.g., every second) and trigger upload and aggregate computation should there be a change in load or availability state of the server.

Publishing operation 320 can publish the load information to a central store (e.g., an object store or a brain). In some embodiments, the load information can include an indication server health, server capacity, server resource utilization, predicted server resource utilization, server processor utilization rates, server wait times, server response times, and/or server queue lengths. While some embodiments may use specific quantitative measures (e.g., processor utilization rates) as part of the load information, other embodiments may use or also include a qualitative metric or labels to indicate the status. For example, these qualitative labels may include, but are not limited to, loaded, fully loaded, accepting traffic, unavailable, available, busy, and/or the like Receiving operation 330 receives (e.g., at the object store) the loading status and then aggregation operation 340 aggregates and re-computes load state of the scaling unit that the server belongs to. Specific aggregation rules may be setup for the computation of the load state. While some embodiments may use specific equations and metrics, other embodiments may utilize fuzzy logic techniques for combining qualitative status labels. In some embodiments, all servers in a given rack belong to one scaling unit (e.g., each set of twenty to forty-five servers can be grouped together into scaling units). The aggregate loading status computed during aggregation operation 340 may discard or discount any data point (e.g., loading status from a particular server) that is stale (e.g., past an expiration time or greater than a threshold X duration). In some embodiments, if more than a certain number or percentage of data points (e.g., 50% of data points) for scaling units are discarded due to staleness or being over-utilized, then aggregation operation 340 can identify the aggregated state as "not usable."

Identification operation 350 can identify which scaling units that can server incoming traffic based on aggregated load status and, possibly, closeness (e.g. logically or physically) to the calling server. For example, in some embodiments, a separate service running on each server can make a call to a central store (e.g., every 30 secs) to identify which scaling units the incoming traffic should be routed to. The central store may only return scaling units that are nearest to the calling server and does not have a computed state of "overloaded". This ensures that as soon as a scaling unit is computed as "overloaded" by the central store within seconds the incoming traffic to the scaling unit starts decreasing.

As a result, various embodiments have a smaller fault domain/scaling unit size, computation of load and availability state of the scaling unit can be based on a central store; and/or computation at publishing; load and availability state is re-computed for the scaling unit each time a server uploads a load and availability state. This is feasible because of smaller scaling unit size. In addition, some embodiments provide for (near) real-time reaction to change in load/availability state of scaling unit. As a result, within seconds of a change in state, the system can start reducing the total incoming traffic to the scaling unit.

Figure 4:
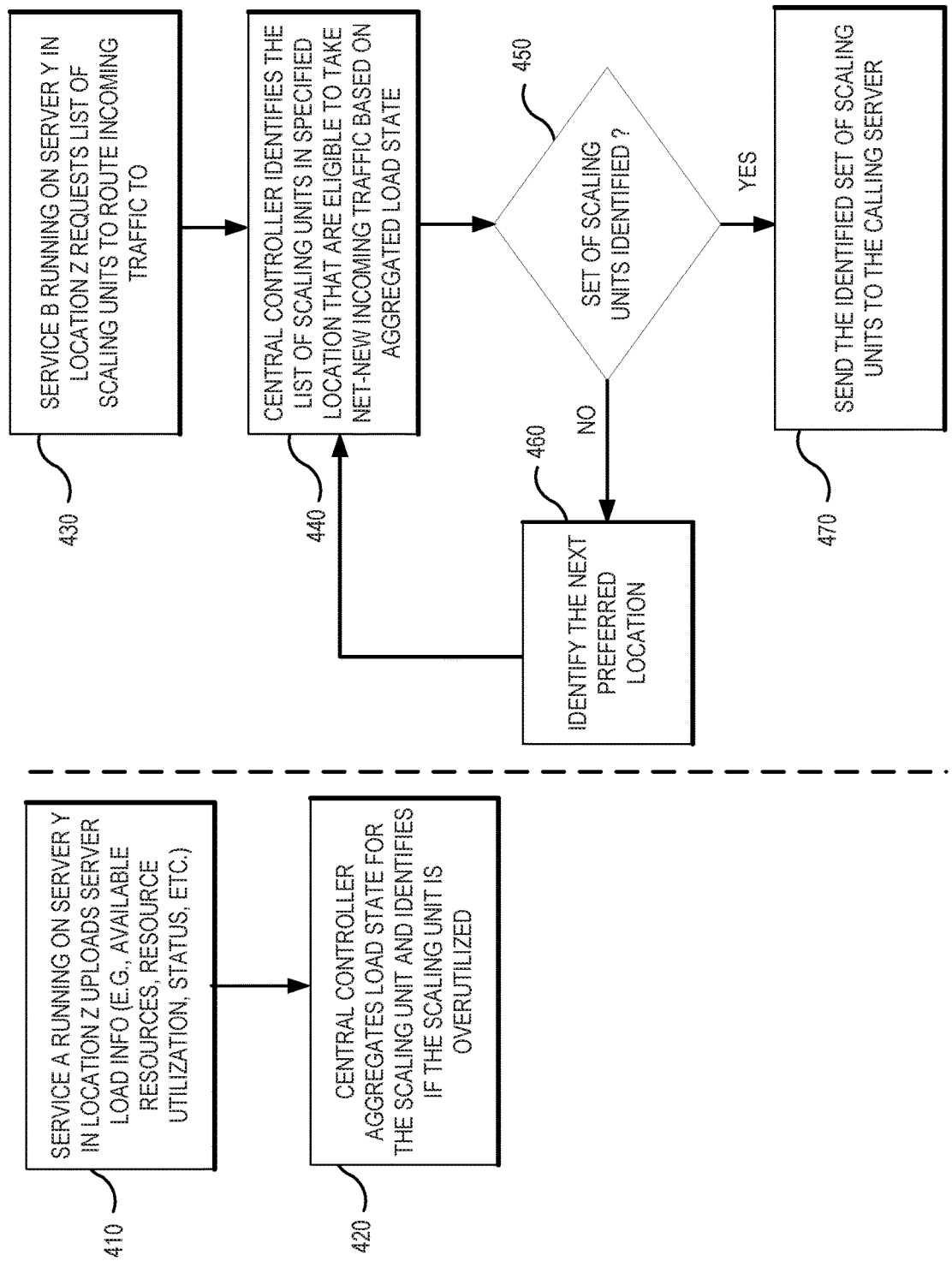
FIG. 4 illustrates an example of a set of operations for routing traffic based on real-time (or near real-time) computation of scaling unit load that may be used in one or more embodiments of the present technology.

FIG. 4 illustrates an example of a set of operations 400 for routing traffic based on real-time (or near real-time) computation of scaling unit load that may be used in one or more embodiments of the present technology. As illustrated in FIG. 4, service A running on a server Y in location Z can upload server load information to a central controller during reporting operation 410. Using aggregation operation 420, a central controller can aggregate the load state for the scaling unit and identify whether the scaling unit is overutilized. In some embodiments, aggregation operation 420 may also classify the scaling units with other rankings such as, but not limited to, critical, high, normal, low, and the like.

Service B running on server Y in location Z can use requesting operation 430 to request a list of scaling units to route incoming traffic to. During identification operation 440, the central controller can identify the list of scaling units in a specified location that are eligible to take net-new incoming traffic based on an aggregated load state. Determination operation 450 can determine if a required set of scaling units can be identified to route incoming traffic to in location Z. When determination operation 450 determines that no set of scaling units can be identified, then determination operation 450 branches to identification operation 460 that identifies the next preferred location that can be used by identification operation 440. For example, the nearest, least busy scaling unit or server can be selected that minimizes latency. When determination operation 450 determines that a set of scaling units has been identified, then determination operation 450 branches to routing operation 470 where the identified set of scaling units is returned to the calling server.

Figure 5:
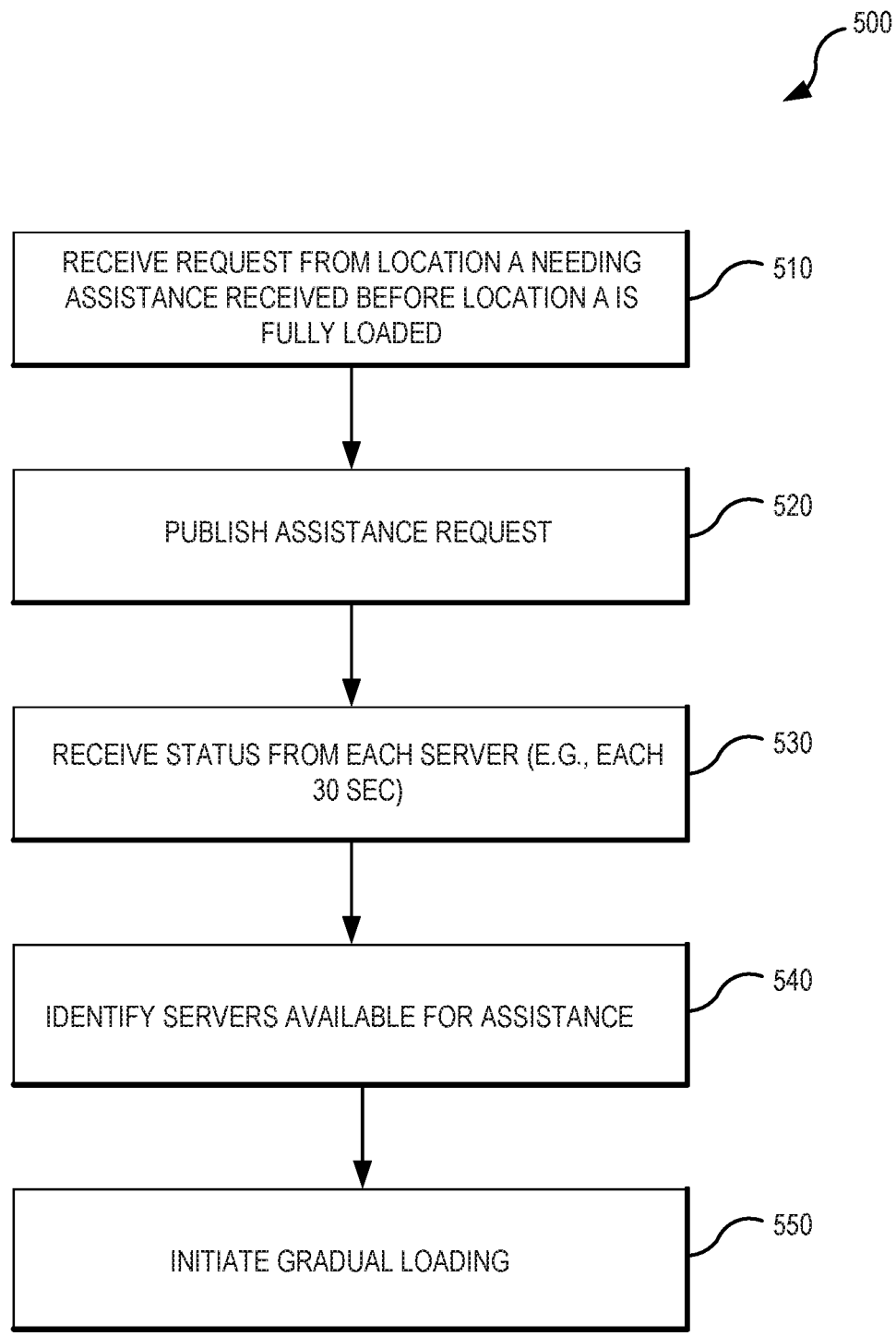
FIG. 5 illustrates an example of a set of operations for assisting servers according to one or more embodiments of the present technology.

FIG. 5 illustrates an example of a set of operations 500 for assisting servers according to one or more embodiments of the present technology. As illustrated in FIG. 5, receiving operation 510 receives an assistance request from a location (e.g., scaling unit, data center, etc.) before the location is fully loaded. Publication operation 520 publishes the assistance request to other locations. Status update operation 530 receives a status update from each sever, rack, scaling unit, or data center. Using this information, identification operation 540 identifies available severs, racks, scaling units, or data centers that are available to assist the location who published the assistance request. In some embodiments, identification operation 540 may use the location of the servers, racks, scaling units, or data centers to rank or prioritize availability. The loading operation 550 can initiate a gradual loading of the destination location.

Figure 6:
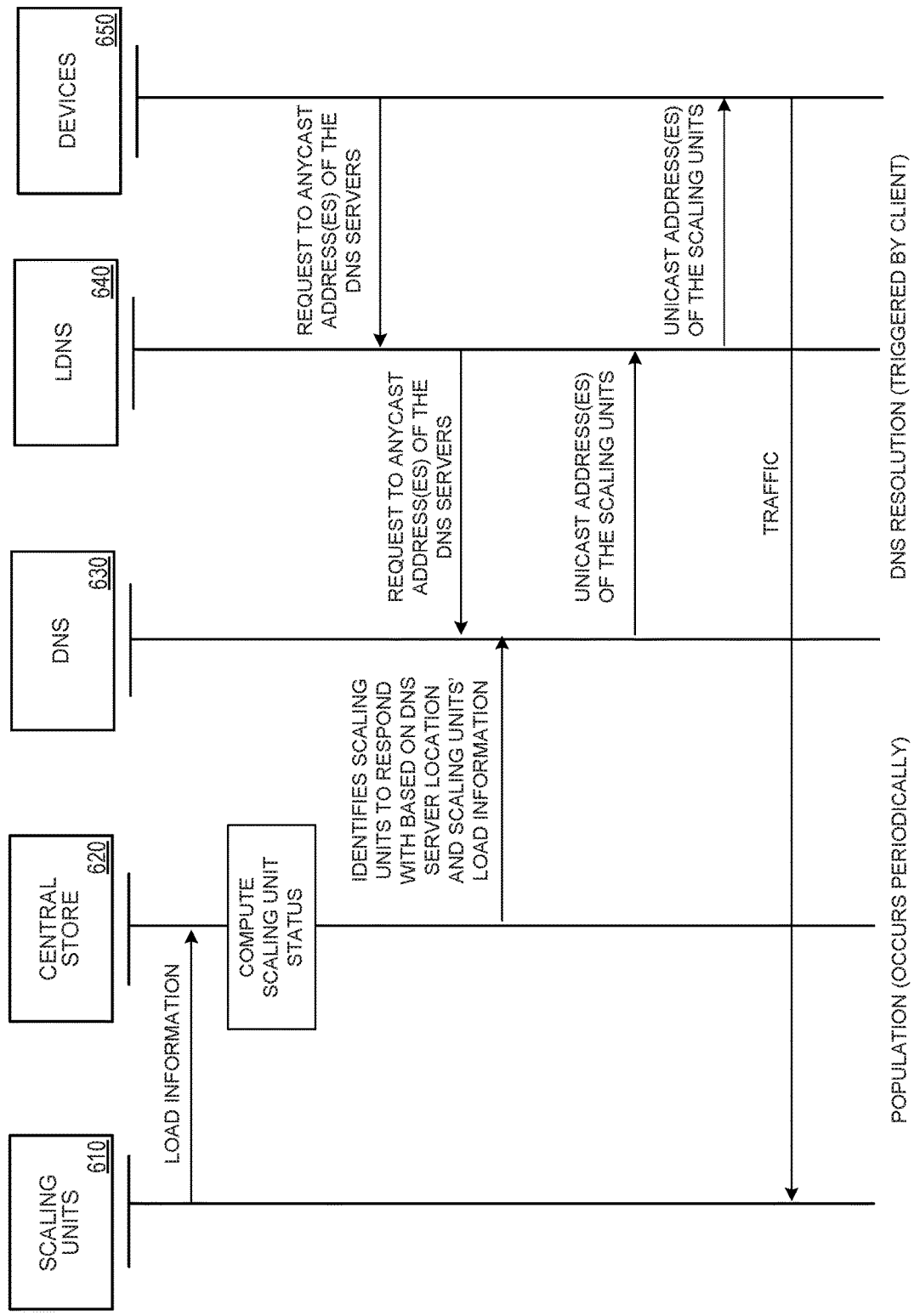
FIG. 6 is a sequence diagram illustrating various communications between components according to one or more embodiments of the present technology.

FIG. 6 is a sequence diagram illustrating various communications between components according to one or more embodiments of the present technology. Scaling units 610 (e.g., server, groups of servers, etc.) can provide loading information to a central store 620. Central store 620 can use the sever loading information to compute a scaling unit status which can be published or otherwise accessible to DNS 630. Device 650 can submit a DNS request via LDNS server 640. As requests are received from LDNS server 640, DNS server 630 can identify one or more scaling units based on the scaling unit status computed by DNS server 630. DNS server 630 can then return one or more unicast addresses corresponding to the identified scaling units. Device 650 can use the unicast addresses to route traffic to selected scaling units 610.

FIG. 7 illustrates computing system 710, which is representative of any system or collection of systems in which the various applications, services, scenarios, and processes disclosed herein may be implemented. For example, computing system 710 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 710 may be implemented as a single apparatus, system, or device or may be implemented in a distributed manner as multiple apparatuses, systems, or devices. Computing system 710 includes, but is not limited to, processing system 720, storage system 730, software 740, applications for process 750, communication interface system 760, and user interface system 770. Processing system 720 is operatively coupled with storage system 730, communication interface system 760, and an optional user interface system 770.

Processing system 720 loads and executes software 740 from storage system 730. When executed by processing system 720 for deployment of scope-based certificates in multi-tenant cloud-based content and collaboration environments, software 740 directs processing system 720 to operate as described herein for at least the various processes, operational scenarios, and sequences discussed in the foregoing implementations. Computing system 710 may optionally include additional devices, features, or functionality not discussed for purposes of brevity.

Referring still to FIG. 7, processing system 720 may comprise a micro-processor and other circuitry that retrieves and executes software 740 from storage system 730. Processing system 720 may be implemented within a single processing device, but may also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 may comprise any computer readable storage media readable by processing system 720 and capable of storing software 740. Storage system 730 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 730 may also include computer readable communication media over which at least some of software 740 may be communicated internally or externally. Storage system 730 may be implemented as a single storage device, but may also be implemented across multiple storage devices or sub-systems co-located or distributed relative to each other. Storage system 730 may comprise additional elements, such as a controller, capable of communicating with processing system 720 or possibly other systems.

Software 740 may be implemented in program instructions and among other functions may, when executed by processing system 720, direct processing system 720 to operate as described with respect to the various operational scenarios, sequences, and processes illustrated herein. For example, software 740 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or application software. Software 740 may also comprise firmware or some other form of machine-readable processing instructions executable by processing system 720.

In general, software 740 may, when loaded into processing system 720 and executed, transform a suitable apparatus, system, or device (of which computing system 710 is representative) overall from a general-purpose computing system into a special-purpose computing system. Indeed, encoding software on storage system 730 may transform the physical structure of storage system 730. The specific transformation of the physical structure may depend on various factors in different implementations of this description. Examples of such factors may include, but are not limited to, the technology used to implement the storage media of storage system 730 and whether the computer-storage media are characterized as primary or secondary storage, as well as other factors.

For example, if the computer readable storage media are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

In general, process 750 can be hosted in the cloud as a service, distributed across computing devices between the various endpoints, hosted as a feature of a cloud enabled information creation and editing solution. Communication interface system 760 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 770 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 770. In some cases, the input and output devices may be combined in a single device, such as a display capable of displaying images and receiving touch gestures. The aforementioned user input and output devices are well known in the art and need not be discussed at length here. In some cases, the user interface system 770 may be omitted when the computing system 710 is implemented as one or more server computers such as, for example, blade servers, rack servers, or any other type of computing server system (or collection thereof).

User interface system 770 may also include associated user interface software executable by processing system 720 in support of the various user input and output devices discussed above. Separately or in conjunction with each other and other hardware and software elements, the user interface software and user interface devices may support a graphical user interface, a natural user interface, an artificial intelligence agent (e.g. an enhanced version of Microsoft's Cortana assistant, Amazon's Alexa, or Apple's Siri, Google's Assistant, etc.), or any other type of user interface, in which a user interface to a productivity application may be presented.

Communication between computing system 710 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for operating a domain name system (DNS) server, the method comprising:
   receiving, at a central controller from a first set of servers, a capacity request indicating that the first set of servers is nearing capacity, wherein the indication that the first set of servers is nearing capacity indicates that the first set of servers is using an available capacity that exceeds a threshold capacity needed to serve a current rate of incoming traffic to the first set of servers plus a buffer capacity;
   publishing, by the central controller in response to receiving the capacity request, an assistance request to additional sets of servers;
   receiving, by the central controller in response to the assistance request, a status update providing load and availability information from each of the additional sets of servers;
   selecting, by the central controller based on the load and availability information, a second set of servers from the additional sets of servers; and
   gradually routing, by the central controller, traffic away from the first set of servers to the second set of servers.

2. The method of claim 1, wherein the status update includes an indication of server processor utilization rates.

3. The method of claim 1, wherein:
   the first set of servers comprises a first scaling unit;
   the additional sets of servers comprise additional scaling units; and
   the second set of servers comprises a second scaling unit.

4. The method of claim 3, wherein:
   the first scaling unit includes a first dynamic group of servers based on at least one of physical attributes of servers of the first dynamic group of servers and logical attributes of servers of the first dynamic group of servers;
   each scaling unit of the additional scaling units includes a dynamic group of servers based on at least one of physical attributes of servers of the dynamic group of servers and logical attributes of servers of the dynamic group of servers; and
   the second scaling unit includes a second dynamic group of servers based on at least one of physical attributes of servers of the second dynamic groups of servers and logical attributes of servers of the second dynamic group of servers.

5. The method of claim 3, wherein receiving the status update providing load and availability information from each of the additional sets of servers comprises generating a scaling unit status for each scaling unit of the additional scaling units by aggregating status updates from servers within each scaling unit of the additional scaling units.

6. The method of claim 5, further comprising storing the scaling unit status for each scaling unit of the additional scaling units in a central store.

7. The method of claim 1, wherein the buffer capacity is based on a predicted future rate of traffic.

8. The method of claim 1, wherein selecting the second set of servers from the additional sets of servers is based at least in part on minimizing latency.

9. A system for managing server traffic, the system comprising:
- a memory;
- a processor; and
- a central controller, under control of the processor, configured to:
  - determine a status of each server in a set of servers,
  - store the status of each server in a central store,
  - receive, from a first set of servers, a capacity request indicating that the first set of servers is nearing capacity, wherein the indication that the first set of servers is nearing capacity indicates that the first set of servers is using an available capacity that exceeds a threshold capacity needed to serve a current rate of incoming traffic to the first set of servers plus a buffer capacity,
  - identify, using the central store, a second set of servers that have a status indicating capacity to accept traffic, and
  - gradually route traffic away from the first set of servers to the second set of servers.

10. The system of claim 9, wherein the status includes an indication of server processor utilization rates.

11. The system of claim 9, wherein the central controller receives the status from each server in the set of servers on a periodic schedule and generates a scaling unit status by aggregating status updates from servers within a scaling unit.

12. The system of claim 9, wherein identifying the second set of servers is based at least in part on minimizing latency.

13. The system of claim 9, wherein the buffer capacity is based on a predicted future rate of traffic.

14. The system of claim 9, further comprising a topology service to collect topology information of a data center and communicate the topology information to the central controller.

15. The system of claim 9, wherein the set of servers are organized into scaling units based on physical or logical attributes.

16. A computer-readable storage medium comprising a set of instructions that, upon execution by one or more processors, cause the one or more processors to:
- receive, from a first set of servers, a capacity request indicating that the first set of servers is nearing capacity, wherein the indication that the first set of servers is nearing capacity indicates that the first set of servers is using an available capacity that exceeds a threshold capacity needed to serve a current rate of incoming traffic to the first set of servers plus a buffer capacity;
- publish, in response to receiving the capacity request, an assistance request to additional sets of servers;
- receive, in response to the assistance request, a status update providing load and availability information from each of the additional sets of servers;
- select, based on the load and availability information, a second set of servers from the additional sets of servers; and
- gradually route traffic away from the first set of servers to the second set of servers.

17. The computer-readable storage medium of claim 16, wherein the set of instructions comprises further instructions that, upon execution by the one or more processors, cause the one or more processors to monitor the status of the first set of servers and upon detecting that the first set of servers is no longer nearing capacity stop routing traffic away from the first set of servers.

18. The computer-readable storage medium of claim 16, wherein the status includes an indication of server processor utilization rates.

19. The computer-readable storage medium of claim 16, wherein the first set of servers and the additional sets of servers are organized into multiple scaling units based on logical or physical attributes and wherein the set of instructions comprises further instructions that, upon execution by the one or more processors, cause the one or more processors to set a scaling unit status as loaded upon determining that any of the multiple scaling units reach a threshold of servers having a not in service status or a loaded to a critical load status.

20. The computer-readable storage medium of claim 19, wherein the set of instructions comprises further instruction that, upon execution by the one or more processors, cause the one or more processors to identify a denial of service attack based on the current rate of incoming traffic.

* * * * *